United States Patent
Bararsani et al.

(10) Patent No.: US 9,594,758 B2
(45) Date of Patent: Mar. 14, 2017

(54) METHOD AND APPARATUSES FOR ENABLING RECOMMENDATIONS

(75) Inventors: Azadeh Bararsani, Serris (FR); Mattias Lidström, Stockholm (SE); Joakim Söderberg, Solna (SE)

(73) Assignee: TELEFONAKTIEBOLAGET L M ERICSSON, Stockholm (SE)

( * ) Notice: Subject to any disclaimer, the term of this patent is extended or adjusted under 35 U.S.C. 154(b) by 382 days.

(21) Appl. No.: 14/349,434

(22) PCT Filed: Oct. 5, 2011

(86) PCT No.: PCT/EP2011/067401
§ 371 (c)(1),
(2), (4) Date: Apr. 3, 2014

(87) PCT Pub. No.: WO2013/050072
PCT Pub. Date: Apr. 11, 2013

(65) Prior Publication Data
US 2014/0244667 A1    Aug. 28, 2014

(51) Int. Cl.
*G06F 17/30* (2006.01)

(52) U.S. Cl.
CPC .. *G06F 17/30017* (2013.01); *G06F 17/30029* (2013.01); *G06F 17/30053* (2013.01); *G06F 17/30958* (2013.01)

(58) Field of Classification Search
CPC ......... G06F 17/30017; G06F 17/30029; G06F 17/30053; G06F 17/30958
USPC ....................................................... 707/751
See application file for complete search history.

(56) References Cited

U.S. PATENT DOCUMENTS

| | | | | |
|---|---|---|---|---|
| 8,095,546 B1 * | 1/2012 | Baluja | ............... | G06F 17/30958 707/750 |
| 8,559,731 B2 * | 10/2013 | Mass | ................. | G06F 17/30265 382/159 |
| 2002/0173971 A1 * | 11/2002 | Stirpe | ............... | G06F 17/30867 707/E17.109 |

(Continued)

OTHER PUBLICATIONS

Debnath, Souvik et al., "Feature Weighting in Content Based Recommendation System Using Social Network Analysis", Association for Computing Machinery, WWW 2008, Poster Paper, Beijing, China, Apr. 21-25, 2008,1041-1042.

*Primary Examiner* — Rehana Perveen
*Assistant Examiner* — Tiffany Thuy Bui
(74) *Attorney, Agent, or Firm* — Patents on Demand, P.A.; Brian K. Buchheit; Scott M. Garrett

(57) ABSTRACT

Method and a recommendation system (200) for making a media item recommendation to a user. A weighted graph is created (2:2) that comprises item nodes representing media items and edges linking the item nodes. Weights are also assigned to the edges based on weights of contributors shared by the linked item nodes. When an initial media item of interest to the user is identified (2:4), the recommendation system determines (2:5) a set of media items which are linked to the initial media item in a weighted graph. At least one of the determined set of media items is also selected based on the assigned weight of edges linking the media items to the initial media item. The recommendation system then provides (2:6) the media item recommendation with the at least one selected media item to the user.

12 Claims, 4 Drawing Sheets

(56) References Cited

U.S. PATENT DOCUMENTS

| | | | |
|---|---|---|---|
| 2004/0068552 A1* | 4/2004 | Kotz | H04L 29/06027 709/218 |
| 2007/0282886 A1* | 12/2007 | Purang | G06F 17/30991 707/999.01 |
| 2008/0134039 A1* | 6/2008 | Fischer | G06F 17/30053 707/E17.009 |
| 2009/0013002 A1* | 1/2009 | Eggink | G06F 17/30702 707/999.107 |
| 2009/0055377 A1* | 2/2009 | Hedge | G06F 17/30029 707/999.005 |
| 2009/0063459 A1* | 3/2009 | Acharya | G06F 17/30749 707/999.005 |
| 2009/0300008 A1* | 12/2009 | Hangartner | G11B 27/105 707/999.003 |
| 2010/0318544 A1* | 12/2010 | Nicolov | G06F 17/30035 707/759 |
| 2010/0325125 A1 | 12/2010 | Bomfim et al. | |
| 2012/0254060 A1* | 10/2012 | Choudhary | G06Q 30/00 705/347 |
| 2012/0259915 A1* | 10/2012 | Bhatt | G06Q 50/01 709/204 |
| 2012/0303600 A1* | 11/2012 | Mukhopadhyay | G06F 17/30038 707/706 |
| 2013/0066819 A1* | 3/2013 | Nice | G06F 17/30029 706/14 |

\* cited by examiner

METHOD AND APPARATUSES FOR ENABLING RECOMMENDATIONS

TECHNICAL FIELD

The present disclosure relates generally to a method and apparatuses for achieving potentially interesting recommendations of media items to users.

BACKGROUND

Today, a multitude of content providers offer and deliver a huge selection of media content to users, e.g. by means of downloading or streaming of the media, or by delivering physical discs such as Compact Discs (CDs), Digital Versatile Disc (DVDs) and Blu-ray discs. The media content may include music, films, TV programs and electronic games, which will be generally referred to as "media items" in this description. In order to facilitate and support the user's choice of media items, e.g. for purchase or hire, various solutions and mechanisms have been developed for creating relevant and "targeted" recommendations to users in a communication network, for consuming different media items.

It has become quite common to present recommendations of media items to potential customers from a web-based shop or retailer, where the media recommendations have been somehow enriched to be particularly relevant and adapted to the targeted customers. Media recommendations can also be ranked in order of assumed relevance to the user. The recommendations may thus be presented by various content providers in order to achieve efficiency and impact of their marketing activities and offerings. Thereby, the users will also be better served by receiving more relevant and interesting recommendations which could increase their general responsiveness to such recommendations. The media recommendations are typically created by a network node referred to as "recommendation engine" or "recommender system", which can provide recommendations to users e.g. via a content provider, an advertiser or the like.

The recommendation engines or systems of today typically employ a filtering mechanism or the like for extracting media items of interest to recommend, which can basically be divided into "content based filtering" and "collaborative filtering". Briefly described, the content based filtering is configured to determine recommended media items based on information and characteristics of the items and/or the users, while the collaborative filtering is based on ratings of items made by the users. For example, a collaborative filtering algorithm typically determines items to recommend by comparing ratings of items previously made by user and further comparing users with similar characteristics as well. A typical recommendation could be: "customers who bought this product have also bought the following products . . . ."

In order to produce relevant and potentially interesting media recommendations according to existing solutions, information related to individual users is typically used, such as information on purchased items, consumption behaviour, ratings made, and so forth. When ranked recommendations are used, a highly rated media item is typically deemed to be of higher interest than media items with low or no ratings. However, a media item cannot be ranked on such grounds if no-one has ever bought, hired or made a rating of that item yet, which is e.g. the case for newly released items.

FIG. 1 illustrates how a recommendation of media items can be made for a user 100 according to a conventional procedure. In a first shown action 1:1, a central recommendation system 102 collects information related to users' consumption and ratings of various items on a continuous basis. This type of information is typically available from a communication network 104, e.g. in the form of consumption logs and registered item ratings. In this example, the user 100 first issues a request for a media recommendation to the recommendation system 102, in an action 1:2, e.g. from a user terminal or via a content provider, not shown. In response thereto, system 102 creates a suitable recommendation of items, in an action 1:3, based on the collected information and sends the recommendation to the user 100, in an action 1:4. Hopefully, media items can be selected for the recommendation to be of particular interest to the requesting user, if information on that user is available to the recommendation system 102.

It can be understood from the above that a recommendation system or engine will be able to produce particularly relevant recommendations to individual users if it has access to information on the users, e.g. age, profession, interests, personal taste, previously made purchases and ratings, and so forth. However, to generally protect user privacy, such user information may not be available to a recommendation system which must instead rely on more generic information on consumption and previously made ratings of items. Further, items having no ratings or previous usage, such as newly released ones, will not be found with the conventional filtering methods. It is thus a problem with prior solutions that the selection and ranking of media items in a recommendation require user-related or user-generated information, and such recommendations may not be very relevant, e.g. by missing potentially interesting items, due to lack of basis.

SUMMARY

It is an object of the invention to address at least some of the problems and issues outlined above. It is possible to achieve these objects and others by using a method and an apparatus as defined in the attached independent claims.

According to one aspect, a method is provided in a recommendation system for making a media item recommendation to a user. In this method, an initial media item deemed to be of interest to the user is identified, and a set of media items is then determined which media items are linked to the initial media item in a weighted graph maintained in the recommendation system. The weighted graph comprises item nodes representing media items and edges linking the item nodes wherein weights are assigned to the edges based on weights of contributors shared by the linked item nodes. At least one of the determined set of media items is selected based on the assigned weight of edges linking the set of media items to the initial media item. The recommendation system then provides the at least one selected media item in the media item recommendation to the user.

According to another aspect, a recommendation system is configured to make media item recommendations to users. The recommendation system comprises a graph creation unit adapted to create a weighted graph comprising item nodes and edges linking the item nodes wherein weights are assigned to the edges based on weights of contributors shared by the linked item nodes. The recommendation system further comprises an identifying unit adapted to identify an initial media item deemed to be of interest to a user, and a logic unit adapted to determine a set of media items which are linked to the initial media item in the weighted graph. The logic unit is also adapted to select at least one of the determined set of media items based on the assigned weight of edges linking the set of media items to the initial media item. The recommendation system further comprises a providing unit adapted to provide the at least one selected media item in the media item recommendation to the user.

According to another aspect, a media provider unit is configured to support media item recommendations to users. The media provider unit comprises a meta data unit adapted to provide meta data relating to media items and contributors, to a recommender system. Thereby, the recommender system is enabled to create a weighted graph comprising item nodes and edges linking the item nodes, and to assign weights to the edges based on weights of contributors shared by the linked item nodes. The media provider unit further comprises a trigger unit adapted to send a trigger to the recommender system for a recommendation related to an initial media item deemed to be of interest to a user. The media provider unit also comprises a receiving unit adapted to receive a media item recommendation with at least one media item selected from a set of media items which are linked to the initial media item in the weighted graph, and which have been selected based on the assigned weight of edges linking the set of media items to the initial media item.

An advantage of the solution according to any of the above aspects is that it enables recommendation of one or more media items potentially interesting to a particular user, even when no or very little information is available on previous usage and ratings of the recommended item(s), which is typically the case for newly released media items. Further, it is not necessary to have access to preferences or personal characteristics of the user such that the user's privacy can also be maintained.

The above method and recommendation system may be configured and implemented according to different optional embodiments. In one possible embodiment, at least one media item having the highest weight of its edge linking the initial media item is selected from the determined set of media items for the recommendation. Thereby, the most potentially interesting media item(s) can be given in the recommendation. In another possible embodiment, a plurality of media items are ranked in the recommendation according to the weight of their edges linking the initial media item, e.g. to make the recommendation easy to grasp.

In further possible embodiments, creating the weighted graph includes creating a base graph comprising the item nodes and contributor nodes representing the contributors and being linked to the item nodes. Weights are then calculated for the item nodes and contributor nodes based on meta data relating to the corresponding media items and contributors. The contributor nodes are further replaced with the edges linking the item nodes, and the weighted graph is completed by assigning weights to the edges based on the weights calculated for the replaced contributor nodes.

In this process, the weights may be calculated for the item nodes and contributor nodes by using, without limitation, at least one of: Eigenvector Centrality and PageRank. Further, the meta data may be obtained from one or more content providers providing the media items.

In the weighted graph, the weights may be assigned to the edges further based on weights of awards mutual to the linked item nodes. In other possible embodiments, the initial media item may be identified e.g. when given explicitly in a received recommendation request, or by detecting that it has been previously consumed and/or rated highly by the user.

Further possible features and benefits of this solution will become apparent from the detailed description below.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to make relevant and interesting recommendations of media items to users, even when very little or no information is available on the requesting users, or on previously made ratings and purchases of media items to recommend such as newly released ones. This can be accomplished by taking into account how different media items are related to each other in terms of having mutual and shared contributors such as actors and directors, and optionally also awards. For example, a movie starring a particular famous actor can be of special interest to a user having previously consumed and/or rated highly another movie starring the same actor being thus a mutual and shared contributor to both movies.

Before making recommendations, this solution also involves creating a weighted graph with multiple item nodes, representing different media items, and edges linking the item nodes, representing mutual contributors, which can be built up and stored in the form of data representations of the nodes and edges. This graph is "weighted" in the sense that weights are assigned to the edges based on given weights of contributors, and optionally also awards, which are shared by, i.e. mutual to, the linked item nodes in the graph. The weighted graph can be created from information on a variety of media items, contributors and awards, which information is typically available from media providers. It will be described in more detail later below how this weighted graph can be built up and created from such available information.

When a trigger is received for creating a recommendation for a user, an initial media item is identified which the user has proved to be interested in, e.g. by previously rating that item highly, or by purchasing or hiring it. The weighted graph is used for determining a set of media items which are linked to the initial media item by weighted edges in the graph. One or more of the linked media items are then selected based on the weights of the edges linking them to the initial media item, i.e. the media items with edges of the highest weights implying that these media items have highly weighted contributors and/or awards in common with the initial media item. Thereby, the selection of media items to recommend for a particular user can be enriched by this solution which can be used either as an alternative to or in combination with any previously available methods such as collaborative filtering.

Figure 1:
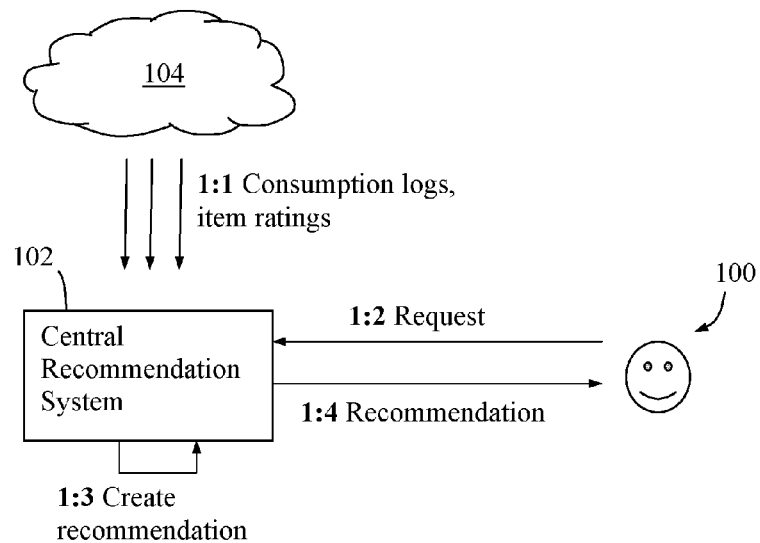
FIG. 1 is a scenario illustrating how recommendations are made, according to the prior art.
Figure 2:
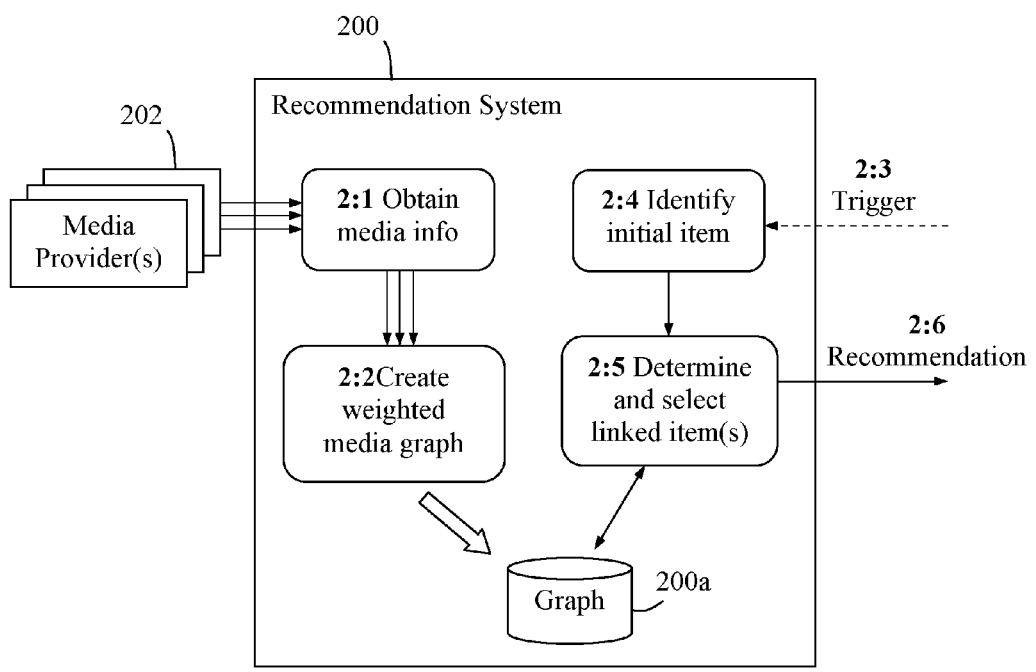
FIG. 2 is a block diagram illustrating how recommendations are created by a recommendation system, according to some possible embodiments.

A possible embodiment of the solution will now be outlined with reference to FIG. 2, illustrating an overview of a flow of actions in a recommendation system 200 having a weighted graph 200a. In a first phase of the solution, which could be referred to as a configuration or preparation phase, the weighted graph 200a is built up from information available from one or more media providers 202. In a second phase of the solution, which could be referred to as a run-time or usage phase, the weighted graph 200a is used for creating media item recommendations for users, by selecting media items from the graph 200a based on weights assigned to contributors shared by different media items in the graph.

In the first phase, the system 200 collects and obtains media information in the form of meta data relating to a selection of media items and its contributors, from the media providers 202, in an action 2:1. The selection of media items used for building up the graph 200a may comprise basically all or a selected part of the media items that are available from the media providers 202, and the solution is not limited in this respect. The recommendation system 200 then creates the weighted graph 200a from the obtained media information, in another action 2:2, the graph basically containing item nodes linked by weighted edges or connections, which will be described in more detail further below. In particular, the edges linking the item nodes thus represent the weight of contributors that are mutual to and shared by the linked media items. Examples of how this can be done will be described later below.

In the second phase, the system 200 receives a trigger in an action 2:3 to initiate a recommendation for a user. The trigger may be a request or query received from the user himself or from a content provider serving the user. When receiving the trigger, the system 200 identifies an initial media item in another action 2:4, which may have been provided explicitly as a referenced media item in the request mentioned above. For example, the content provider may have received a recommendation query from the user with reference to a previously consumed or preferred media item, or may have registered a search for a particular item made by the user which can be identified as the initial item, and so forth. Alternatively, the system 200 may identify an item that has been previously purchased or hired or otherwise consumed by the user, as the initial media item.

Once the initial media item has been identified, the recommendation system 200 determines and selects, in a following action 2:5, at least one further media item that is linked to the initial media item in the graph by a weighted edge between the items' respective nodes, the edge thus representing the weight of a contributor that is shared by the initial and selected item node, which will be described in more detail further below. If several item nodes are linked to the node of the initial media item in the graph, one or more of the linked media items can be selected based on the value of the weights of the linking edges. i.e. having the most highly weighted edge(s). Further, plural selected media items may also be ranked in the recommendation according to the weight of their linking edges. Finally, the at least one selected media items are provided in the media item recommendation to the user, in an action 2:6.

A more detailed procedure in a recommendation system, for building up a weighted graph and making a media item recommendation to a user by means of the graph, will now be described with reference to the flow chart in FIG. 3. In a first action 300, the recommendation system obtains meta data relating to media items and to contributors that have in some way contributed to creation and production of the media items, which information may be obtained from one or more media providers, basically corresponding to action 2:1 above. Some exemplary contributors that may be involved in this context may, without limitation, include actors, film directors, producers, script writers, music composers, and so forth. In this action, meta data relating to various awards that can be given to movies and actors etc., may also be obtained if used for building up the weighted graph.

From the obtained meta data of the media items, a base graph is first created, in an action 302, with item nodes and contributor nodes linking the item nodes. In this process, any contributors that have contributed to two different media items, e.g. movies, will be represented by a contributor node connected to the nodes of both items in the base graph, which is illustrated by an example in FIG. 4. In this example, a base graph 400 contains nodes of two media items X an Y, both having actor A as a shared contributor. Of course, media items may have several contributors which can be represented by further contributor nodes connecting to corresponding item nodes in the base graph. In a further possible embodiment, the base graph additionally comprises nodes for various awards, e.g. any well-known film and actor awards such as Oscar and Golden Globe, as well as further less well-known ones such as the Swedish film award "Guldbaggen". Likewise, the award nodes are connected to different nodes of media items and contributors having received respective awards.

Figure 4:
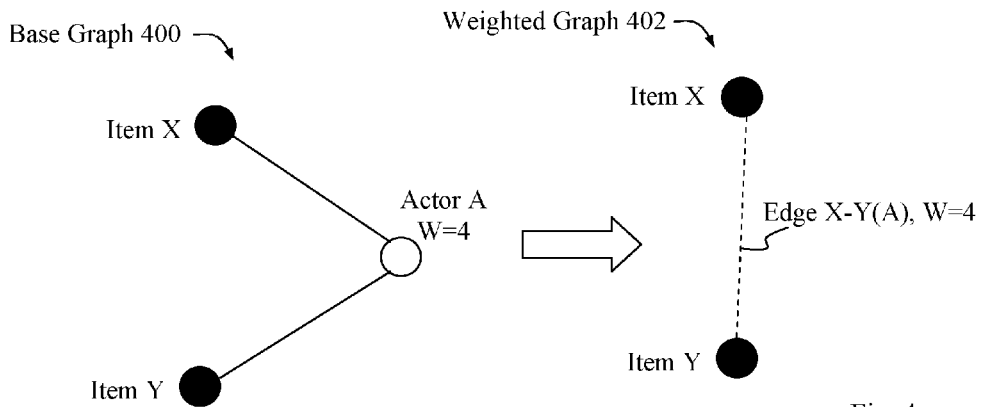
FIGS. 4-6 are schematic diagrams illustrating some examples of how a weighted graph can be created, according to further possible embodiments.

In a next shown action 304, weights are calculated for the item nodes, contributor nodes and any award nodes in the base graph, based on the above obtained meta data relating to the corresponding media items, contributors and awards. For example, an award that belongs to a distinguished international film festival is deemed more valuable and important than a local award in a small country, or a famous actor who has won several awards and has acted in eminent movies is considered more important than a new actor who has no such qualifications, thus implying a relatively higher weight for the more important award or actor. In the example of FIG. 4, a weight "W=4" has been calculated for actor A according to a predefined weight scale or system, e.g. having a range of "W: 1-10".

In some possible embodiments, the weights for the item nodes and contributor nodes, and optionally also the award nodes if used, can be calculated by using an existing method for generally determining the relative importance, or "weight", of a node in a network, such as any of the known methods called Eigenvector Centrality and PageRank although the solution is not limited to these examples. When Eigenvector Centrality is used, the resulting importance or weight of a node is commonly referred to as the "EVC" of that node.

Briefly described, the method known as "Eigenvector Centrality" calculates the relative importance of a node in a network, i.e. how important a media item is in the media graph, based on available meta data of the media item and of its contributors and awards, if any. The details of performing the calculations are known in the art and are not necessary to describe in detail to understand the solution. In brief, this calculation method is based on the principal that connections to high-weighted nodes contribute more to a certain node X than other connections to more low-weighted nodes. The method thus calculates and assigns relative weights, or EVCs, to nodes in the network accordingly. In the base graph, actors who have acted in a movie which has won a valuable reward may thus get a higher weight than others, or if an "important" actor contributes to a movie, that movie will thus get a higher weight by having that actor as contributor. The method known as "PageRank" is an algorithm that is basically a variant of the Eigenvector Centrality, used typically for assigning weights to hyperlink documents on the Internet.

Returning to FIG. 3, a further action 306 illustrates that the recommendation system removes the contributor nodes, and also any award nodes if used, from the base graph and replaces the removed contributor nodes and any removed award nodes with edges linking the remaining item nodes, which is further illustrated by the example in FIG. 4. In this example, the base graph 400 having the nodes X, Y and A is transformed into a weighted graph 402 where the node of actor A is removed and replaced by an edge X-Y(A) linking the item nodes X and Y. Since actor A of the removed contributor node of A was given the weight W=4, the new edge between nodes X and Y is assigned the weight W=4. A next action 308 in the described procedure illustrates that the weighted graph 402 is accordingly created in the above-described manner by assigning weights to the replacing edges based on the weights calculated for the replaced contributor nodes, and also for any replaced award nodes.

Figure 5:
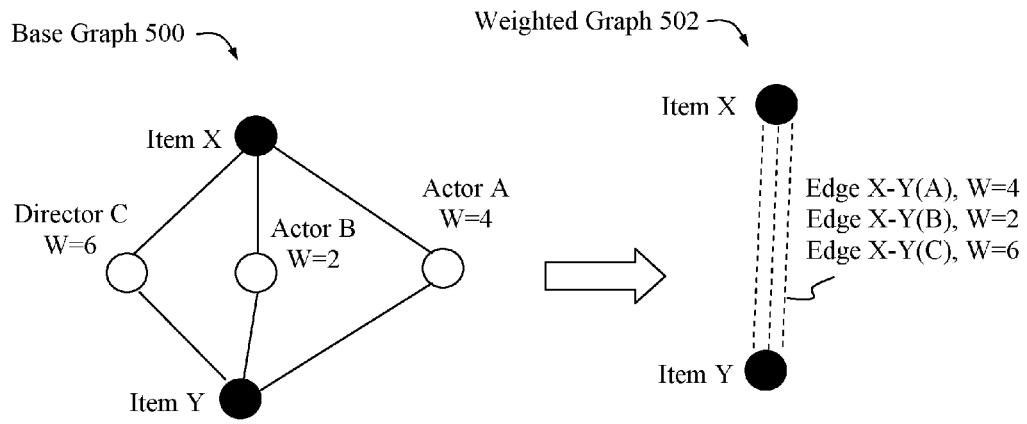

Another slightly more elaborate example of creating a weighted graph from a base graph, is illustrated in FIG. 5. Here, two media items X and Y share two actors A and B as well as a director C which are thus mutual contributors to both items. A base graph 500 is first built up accordingly with contributor nodes for actors A and B and director C, all nodes linking the item nodes of items X and Y. Weights W are then calculated for the three contributor nodes such that W=4 for actor A, W=2 for B and W=6 for director C, e.g. using the above-mentioned Eigenvector Centrality and/or PageRank methods. A weighted graph 502 is then created from the base graph 500 by removing the contributor nodes A-C and replacing them with three distinct edges X-Y(A), X-Y(B) and X-Y(C) as illustrated by dashed lines between item nodes X and Y. Finally, the weights of the removed nodes are then assigned to the replacing edges such that W=4 for edge X-Y(A), W=2 for edge X-Y(B), and W=6 for edge X-Y(C).

Figure 6:
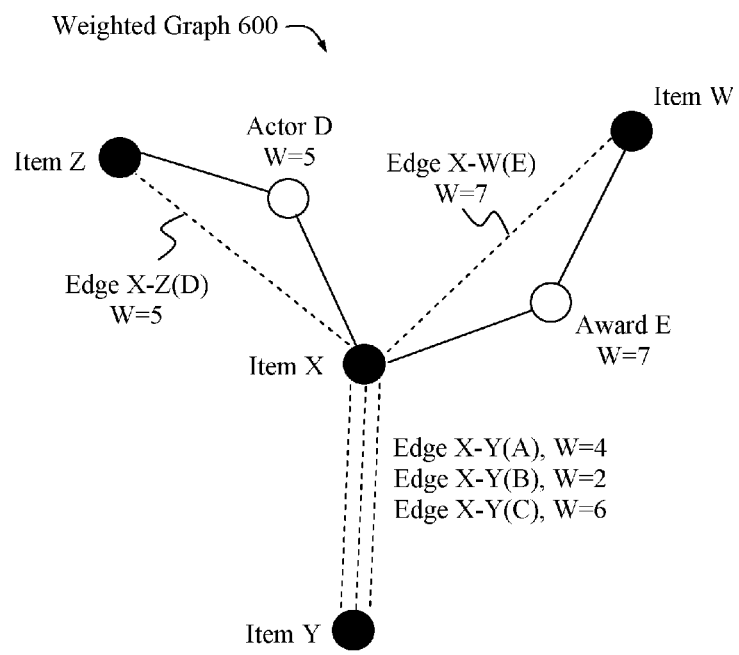

Another even more elaborate example of a weighted graph is illustrated in FIG. 6 where the item nodes X and Y from FIG. 5 are further linked to another two media items Z and W in the weighted graph 600. In this example, media item X shares an actor D with media item Z and also shares an award E with media item W. Weights W=5 and W=7 have been calculated for actor D and award E, respectively, as shown in the figure. Accordingly, the nodes for actor D and award E have been removed from the base graph and replaced by edge X-Z(D) with weight W=5 between items X and Z, and edge X-W(E) with weight W=7 between items X and W, respectively. As a result, media item X has edges of different weights linking it to media items Y, Z and W in the weighted graph 600.

Figure 3:
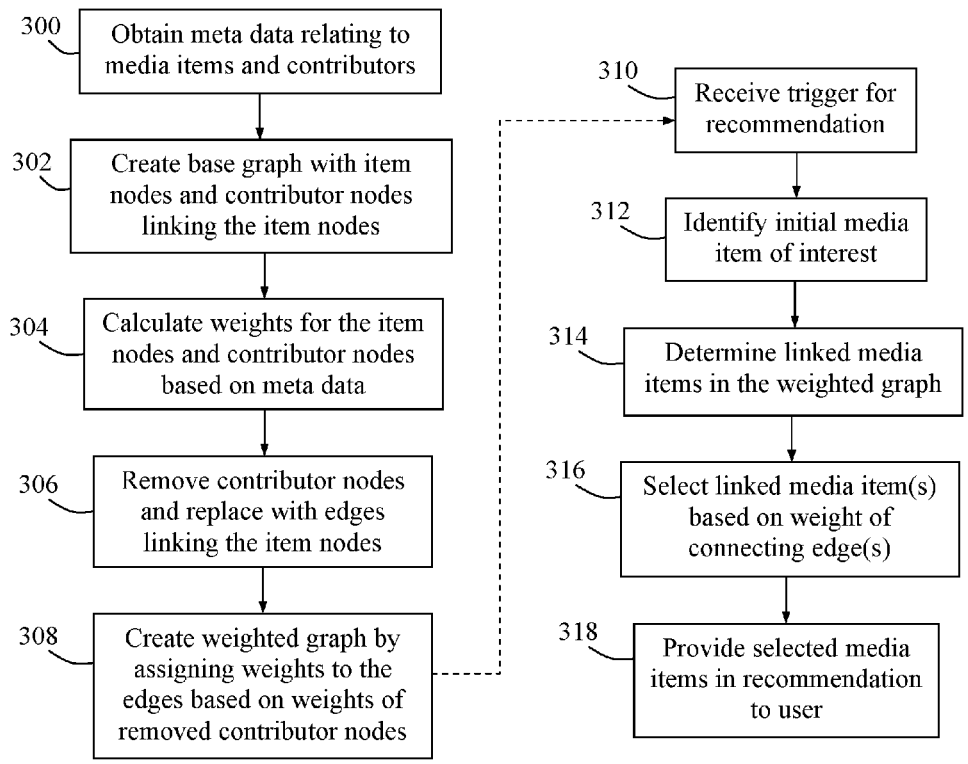
FIG. 3 is a flow chart illustrating a procedure in a recommendation system, according to further possible embodiments.

As indicated above, actions 300-308 of FIG. 3 basically constitute the configuration or preparation phase of the solution, and a dashed arrow indicates that the run-time or usage phase of the solution begins at some point by an action 310 of receiving a trigger for making a recommendation of one or more media items for a particular user. The trigger may be a request or query for a recommendation received from either the user or from a content provider serving the user. A next action 312 indicates that the recommendation system identifies an initial media item deemed to be of interest to the user. For example, the initial media item may be identified when given explicitly in a received recommendation request, or by detecting that it has been previously consumed and/or rated highly by the user. For example, item X in FIG. 6 may be identified as the initial media item, which will be used below to exemplify further actions in this procedure.

In a following action 314, the recommendation system determines a set of media items which are linked to the initial media item in the above created weighted graph, which thus comprises item nodes representing media items and edges linking the item nodes. As described above for action 308, weights have been assigned to the edges based on weights of contributors, and optionally also of awards, which contributors and optional awards are shared by the media items of the linked nodes. In the example of FIG. 6, media items of nodes Y, Z and W can be determined as the set of media items being linked to the initial media item of node X.

A next action 316 illustrates that the recommendation system selects at least one of the determined set of media items based on the assigned weight of edges linking the set of media items to the initial media item. For example, at least one media item having the highest weight of its edge linking the initial media item is selected from the determined set of media items for the recommendation, the weight thus indicating its importance or relevance relative to the initial media item.

The at least one selected media item is then finally provided in the media item recommendation to the user, as illustrated by an action 318. In this way, the recommendation can be made relevant to this particular user, even if no or very little information is available on whether the at least one recommended media item has been consumed or rated by other users in the past, which is typically the case for newly released media items that have not yet been consumed or rated by anyone.

If one or more item nodes have plural edges linking the initial media item, different approaches may be used to evaluate the weights of the respective edges and select a media item for the recommendation. In the example of FIG. 6, item W may be selected as recommended media item for having the highest weight of its edge X-W(E) linking the initial media item X, in this case W=7 which is higher than any of the other edges. On the other hand, item Y may alternatively be selected as recommended media item for having three distinct edges X-Y(A), X-Y(B) and X-Y(C) of different weights linking the initial media item X.

In order to evaluate the weights of plural edges between two nodes, a predetermined algorithm may be used for determining a representative weight, e.g. of the three edges linking media item Y with the initial media item X. The representative weight is then compared with weights of other edges to media item X for selecting at least one media item for the recommendation. In one simplified example, the highest weight of the three original edges between X and Y may be determined as the representative weight, which is used when comparing the linked item nodes. Another approach is to select the item having the greatest number of edges to the initial media item. It is also possible to determine a representative weight of plural edges between two nodes for comparison, by taking the highest weight and increment that weight according to the total number of edges between the two nodes.

Figure 7:
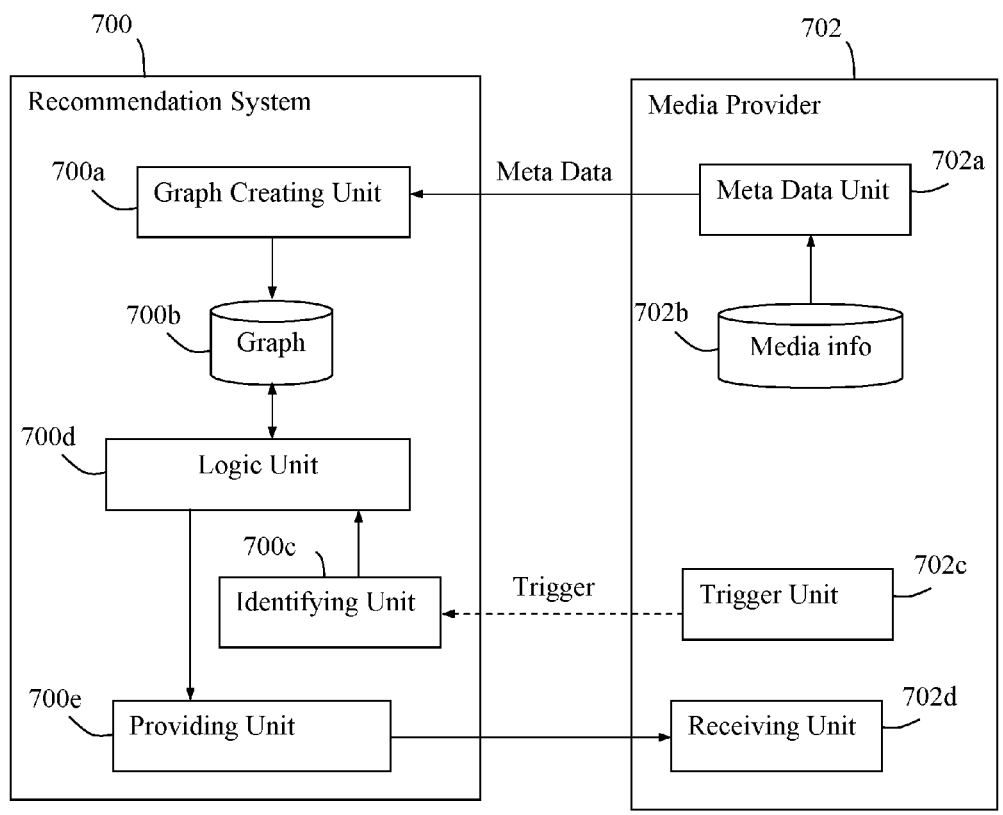
FIG. 7 is a block diagram illustrating a recommendation system and a media provider unit in more detail, according to further possible embodiments.

A detailed but non-limiting example of how a recommendation system can be configured to accomplish the above-described solution, is illustrated by the block diagram in FIG. 7. The recommendation system 700 comprises a graph creating unit 700*a* adapted to create a weighted graph 700*b* comprising item nodes and edges linking the item nodes wherein weights are assigned to the edges based on weights of contributors shared by the linked item nodes.

The recommendation system 700 also comprises an identifying unit 700*c* adapted to identify an initial media item deemed to be of interest to a user, e.g. in response to receiving a trigger from a media provider unit 702 such as a request or query, as described above. The recommendation system 700 also comprises a logic unit 700*d* adapted to determine a set of media items which are linked to the initial media item in the weighted graph. The logic unit 700*d* is also adapted to select at least one of the determined set of media items based on the assigned weight of edges linking the set of media items to the initial media item. The recommendation system 700 also comprises a providing unit 700*e* adapted to provide the at least one selected media item in the media item recommendation to the user. The media item recommendation may be sent to the media provider unit 702 for further delivery to the user.

It should be noted that FIG. 7 merely illustrates various functional units or entities in the recommendation system 700 in a logical sense, although the skilled person is able to implement these functions in practice using suitable software and hardware means. Thus, this aspect of the solution is generally not limited to the shown structures of the recommendation system 700, and the functional units 700*a-e* may be configured to operate according to the features described above for any of FIGS. 2-6, where appropriate.

The functional units 700*a-e* described above can be implemented in the recommendation system 700 as program modules of a respective computer program comprising code means which, when run by a processor "P" causes the base station to perform the above-described actions. The processor P may be a single Central Processing Unit (CPU), or could comprise two or more processing units. For example, the processor P may include general purpose microprocessors, instruction set processors and/or related chips sets and/or special purpose microprocessors such as Application Specific Integrated Circuits (ASICs). The processor P may also comprise a storage for caching purposes.

Each computer program may be carried by a computer program product in the recommendation system 700 in the form of a memory "M" connected to the processor P. The computer program product or memory M comprises a computer readable medium on which the computer program is stored. For example, the memory M may be a flash memory, a Random-Access Memory (RAM), a Read-Only Memory (ROM) or an Electrically Erasable Programmable ROM (EEPROM), and the program modules could in alternative embodiments be distributed on different computer program products in the form of memories within the recommendation system 700.

The above recommendation system 700 and its functional units 700*a-e* may be configured or adapted to operate according to various optional embodiments. In one possible embodiment, the logic unit 700*c* is further adapted to select at least one media item having the highest weight of its edge linking the initial media item from the determined set of media items for the recommendation. The logic unit 700*c* may be further adapted to rank a plurality of media items in the recommendation according to the weight of their edges linking the initial media item.

In further possible embodiments, the graph creation unit 700*a* is further adapted to create a base graph comprising the item nodes and the contributor nodes representing the contributors and being linked to the item nodes, calculate weights for the item nodes and the contributor nodes based on meta data relating to the corresponding media items and contributors, replace the contributor nodes with the edges linking the item nodes, and create the weighted graph 700*b* by assigning weights to the edges based on the weights calculated for the replaced contributor nodes. These features correspond to the procedure described above for actions 302-308 of FIG. 3.

The graph creation unit 700*a* may be further adapted to calculate the weights for the item nodes and contributor nodes by using at least one of the methods Eigenvector Centrality and PageRank, without limitation to these examples. The graph creation unit 700*a* may be further adapted to obtain the meta data from the content provider unit 702 providing the media items. The graph creation unit 700*a* may be further adapted to assign the weights to the edges further based on weights of awards mutual to the linked item nodes. The identifying unit 700*c* may be further adapted to identify the initial media item when given explicitly in a received recommendation request, or by detecting that it has been previously consumed and/or rated highly by the user.

The content provider unit 702 shown in FIG. 7 comprises a meta data unit 702*a* adapted to provide meta data relating to media items and contributors, to the recommender system 700, thereby enabling the recommender system to create the weighted graph 700*b* with item nodes and edges linking the item nodes, and to assign weights to said edges based on weights of contributors shared by the linked item nodes. The content provider unit 702 also comprises a trigger unit 702*c* adapted to send a trigger to the recommender system 700 for a recommendation related to an initial media item deemed to be of interest to a user.

The content provider unit 702 also comprises a receiving unit 702*d* adapted to receive the media item recommendation with at least one media item selected from a set of media items which are linked to the initial media item in the weighted graph, and which have been selected based on the assigned weight of edges linking the set of media items to the initial media item.

When using the solution according to any of the above-described embodiments, it is an advantage that the "best" neighbour media item can be found automatically in the weighted graph as a nomination for a potentially interesting recommendation to the user, even when no or very little information is available on previous usage and ratings of the recommended item. In this solution, the best suggestion of e.g. a movie is not necessarily another movie in the same genre, which is usually the case when using existing recommendation engines. Rather, the best recommendation of a movie to a particular user depends on how interesting other movies are to that user in relation to an initial movie deemed of interest to that user. For example, it is quite common that users like a movie because they like a particular popular actor acting in the movie, and that actor will be given a high weight in this solution, resulting in a high weight of its replacing edge such that a movie starring the same actor can be selected for the recommendation.

Further, it is not necessary in this solution to have access to any preferences or personal characteristics of the user, as long as the initial media item can be identified which is deemed to be of interest to the user. Thereby, privacy of the user can be maintained to a great extent when using this solution.

While the solution has been described with reference to specific exemplary embodiments, the description is generally only intended to illustrate the inventive concept and should not be taken as limiting the scope of the solution. For example, the terms "recommendation system", "media item", "contributor" "graph", "weight", "nodes" and "edges" have been used throughout this description, although any other corresponding entities, functions, and/or parameters could also be used having the features and characteristics described here. The solution is defined by the appended claims.

The invention claimed is:

1. A method in a network node for making a media item recommendation to a user in a communication network, the method comprising:
   identifying an initial media item deemed to be of interest to the user, wherein said initial media item is identified when given explicitly in a received recommendation request at least from a user terminal, or by detecting that it has been previously consumed and/or rated highly by the user;
   determining a set of media items that are linked to the initial media item in a weighted graph, said weighted graph comprising item nodes representing media items and edges linking the item nodes, wherein weights are assigned to said edges based on weights of contributors shared by the linked item nodes;
   selecting at least one of the determined set of media items based on the assigned weight of edges linking said set of media items to the initial media item;
   providing the at least one selected media item in the media item recommendation to the user, wherein the weighted graph is created by:
   creating a base graph comprising said item nodes and contributor nodes representing said contributors and being linked to the item nodes;
   calculating weights for said item nodes and contributor nodes based on meta data relating to the corresponding media items and contributors;
   replacing said contributor nodes with said edges linking the item nodes; and
   creating the weighted graph by assigning weights to the edges based on the weights calculated for the replaced contributor nodes.

2. The method of claim 1, wherein at least one media item having the highest weight of its edge linking the initial media item is selected from the determined set of media items for said recommendation.

3. The method of claim 2, wherein each of a plurality of media items is ranked in the recommendation according to the weight of their edges linking the initial media item.

4. The method of claim 1, wherein the weights are calculated for the item nodes and contributor nodes by using at least one of: Eigenvector Centrality and PageRank.

5. The method of claim 1, wherein said meta data is obtained from one or more content providers providing the media items.

6. The method of claim 1, wherein said weights are assigned to the edges further based on weights of awards mutual to the linked item nodes.

7. A recommendation system configured to make media item recommendations to users in a communication network, the recommendation system comprising:
   one or more processors and a memory coupled to at least one of the one or more processors configured to:
   create a weighted graph comprising item nodes and edges linking the item nodes, wherein weights are assigned to said edges based on weights of contributors shared by the linked item nodes;
   identify an initial media item deemed to be of interest to a user, and to identify said initial media item when given explicitly in a received recommendation request at least from a user terminal, or by detecting that the initial media item has been previously consumed and/or rated highly by the user;
   determine a set of media items which are linked to the initial media item in the weighted graph, and to select at least one of the determined set of media items based on the assigned weight of edges linking said set of media items to the initial media item; and
   provide the at least one selected media item in the media item recommendation to the user, wherein the one or more processors are further configured to:
   create a base graph comprising said item nodes and contributor nodes representing said contributors and being linked to the item nodes;
   calculate weights for said item nodes and contributor nodes based on meta data relating to the corresponding media items and contributors;
   replace said contributor nodes with said edges linking the item nodes; and
   create the weighted graph by assigning weights to the edges based on the weights calculated for the replaced contributor nodes.

8. The recommendation system of claim 7, wherein the one or more processors are further configured to select at least one media item having the highest weight of its edge linking the initial media item from the determined set of media items for said recommendation.

9. The recommendation system of claim 8, wherein the one or more processors are further configured to rank a plurality of media items in the recommendation according to the weight of their edges linking the initial media item.

10. The recommendation system of claim 7, wherein the one or more processors are further configured to calculate the weights for the item nodes and contributor nodes by using at least one of: Eigenvector Centrality and PageRank.

11. The recommendation system of claim 7, wherein the one or more processors are further configured to obtain said meta data from one or more content providers providing the media items.

12. The recommendation system of claim 7, wherein the one or more processors are further configured to assign said weights to the edges further based on weights of awards mutual to the linked item nodes.

* * * * *